(12) United States Patent
Kunimatsu (10) Patent No.: US 11,659,125 B2
(45) Date of Patent: *May 23, 2023

(54) NON-TRANSITORY COMPUTER READABLE STORAGE MEDIUM, INFORMATION PROCESSING DEVICE AND PRINTING METHOD FOR COLLATE PRINTING

(71) Applicant: BROTHER KOGYO KABUSHIKI KAISHA, Nagoya (JP)

(72) Inventor: Akihiro Kunimatsu, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,972

(22) Filed: Feb. 7, 2022

(65) Prior Publication Data
US 2022/0159142 A1 May 19, 2022

Related U.S. Application Data

(63) Continuation of application No. 17/212,273, filed on Mar. 25, 2021, now Pat. No. 11,277,540, which is a
(Continued)

(30) Foreign Application Priority Data

Sep. 30, 2019 (JP) .............................. JP2019-179047

(51) Int. Cl.
*H04N 1/32* (2006.01)
*H04N 1/00* (2006.01)
*H04N 1/23* (2006.01)

(52) U.S. Cl.
CPC ..... *H04N 1/32566* (2013.01); *H04N 1/00973* (2013.01); *H04N 1/2338* (2013.01)

(58) Field of Classification Search
None
See application file for complete search history.

(56) References Cited

U.S. PATENT DOCUMENTS

| 2008/0037054 A1 | 2/2008 | Hasegawa et al. |
| 2016/0103638 A1 | 4/2016 | Fukunaga |
| 2018/0067704 A1 | 3/2018 | Kobayashi |

FOREIGN PATENT DOCUMENTS

| JP | 2008-077158 A | 4/2008 |
| JP | 2013-250613 A | 12/2013 |

(Continued)

OTHER PUBLICATIONS

International Search Report and Written Opinion dated Aug. 11, 2020 from related PCT/JP2020/025802.
(Continued)

*Primary Examiner* — Lennin R Rodriguezgonzalez
*Assistant Examiner* — Lennin R Rodriguez
(74) *Attorney, Agent, or Firm* — Scully, Scott, Murphy & Presser, PC (57) ABSTRACT

Provided is technology by which an information processing device having an OS standard printing program installed therein causes a printer to perform collate printing without applying a load to the printer. In a case where a print instruction that causes a printer to execute printing of an image is output from an editing application to a general-purpose print program installed in an OS to cause the printer to execute collate printing in a job based on the print instruction an auxiliary program causes a CPU of a PC to acquire print data of one copy rasterized based on the image having the plurality of pages, and to cause the PC to transmit the acquired print data of the one copy to the printer as a transmission destination one copy by one copy over the N copies.

5 Claims, 6 Drawing Sheets

Related U.S. Application Data continuation of application No. PCT/JP2020/025802, filed on Jul. 1, 2020.

(56) References Cited

FOREIGN PATENT DOCUMENTS

| | | |
|---|---|---|
| JP | 2018-092583 A | 6/2018 |
| JP | 2018-099804 A | 6/2018 |

OTHER PUBLICATIONS

Notice of Allowance dated Nov. 10, 2021 from parent application U.S. Appl. No. 17/212,273, filed Mar. 25, 2021.

NON-TRANSITORY COMPUTER READABLE STORAGE MEDIUM, INFORMATION PROCESSING DEVICE AND PRINTING METHOD FOR COLLATE PRINTING

CROSS-REFERENCE TO RELATED APPLICATIONS

This is a continuation application of U.S. Ser. No. 17/212,273 filed on Mar. 25, 2021, which is a continuation application of International Application No. PCT/JP2020/025802 filed on Jul. 1, 2020 which claims priority from Japanese Patent Application No. 2019-179047 filed on Sep. 30, 2019. The entire contents of the earlier applications are incorporated herein by reference.

TECHNICAL FIELD

A technical field disclosed herein relates to a non-transitory computer readable storage medium that stores a support program for supporting control on a printer, an information processing device, and a printing method.

BACKGROUND

As technology of controlling a printer from an information processing device such as a personal computer, for example, known is a configuration where a job, in which collate printing of printing sequentially a plurality of copies of a document having a plurality of pages one copy by one copy is set, is input to a printer by a printer driver.

In recent years, technology of controlling a printer by a printing program standardly installed in an operating system (hereinbelow, referred to as "OS"), without using the above-described printer driver, is put into practical use. In the technology, the OS associates the printer and the OS standard printing program, and when a print instruction for the printer is received thereafter, printing by the OS standard printing program can be performed without using the printer driver.

However, when performing printing by an OS standard general-purpose print program, setting items that can be selected when selecting printing parameters are general items registered in the OS standard printing program. For this reason, the collate printing may not be supported, which causes user's inconvenience. Also, although the collate printing can be performed in processing on the printer-side, a load is applied to the printer, such as an increase in memory capacity that is mounted to the printer.

SUMMARY

The present specification discloses technology by which an information processing device having an OS standard printing program installed therein causes a printer to perform collate printing without applying a load to the printer.

Disclosed here is a non-transitory computer readable medium that stores a support program executable by a computer included in an information processing device, the support program being corresponding to a printer connected to the information processing device, in a case where a print instruction that is output from an application program installed in the information processing device and that causes the printer to execute printing of an image is sent to a general-purpose print program installed in advance in an operating system of the information processing device to cause the printer to execute collate printing in a job based on the print instruction, the collate printing being processing of sequentially printing N copies one copy by one copy, printing of the one copy being printing of the image having a plurality of pages that is a range of a print target, N being a natural number of 2 or greater, the support program causing the computer to execute: first acquisition processing of acquiring print data of the one copy rasterized based on the image having the plurality of pages; and first output processing of outputting the print data of the one copy acquired in the first acquisition processing one copy by one copy over the N copies such that the print data is transmitted from the information processing device to the printer as a transmission destination.

In the case where the print instruction is output from the application program to the general-purpose print program to cause the printer to execute the collate printing in the job based on the print instruction, the support program disclosed herein causes the information processing device to acquire the print data of one copy rasterized based on the image having the plurality of pages and to transmit the print data to the printer one copy by one copy over the N copies. Thereby, even though the general-purpose print program does not support the collate printing, it is possible to cause the printer to execute the collate printing.

An information processing device in which the program is installed and a control method for implementing the functions of the program are also novel and useful.

According to the technology disclosed herein, it is possible to implement the technology by which the information processing device having the OS standard printing program installed therein causes the printer to execute the collate printing without applying a load to the printer.

BRIEF DESCRIPTION OF DRAWINGS

Aspects of the disclosure are illustrated by way of example and not by limitation in the accompanying figures in which like reference characters indicate similar elements.

DETAILED DESCRIPTION

Hereinbelow, a personal computer (hereinbelow, referred to as "PC") that uses a program of a first aspect will be described in detail with reference to the accompanying drawings. The present aspect is to disclose an embodiment in which a program, which is executed in the PC connected to a printer having a printing function, is implemented.

Figure 1:
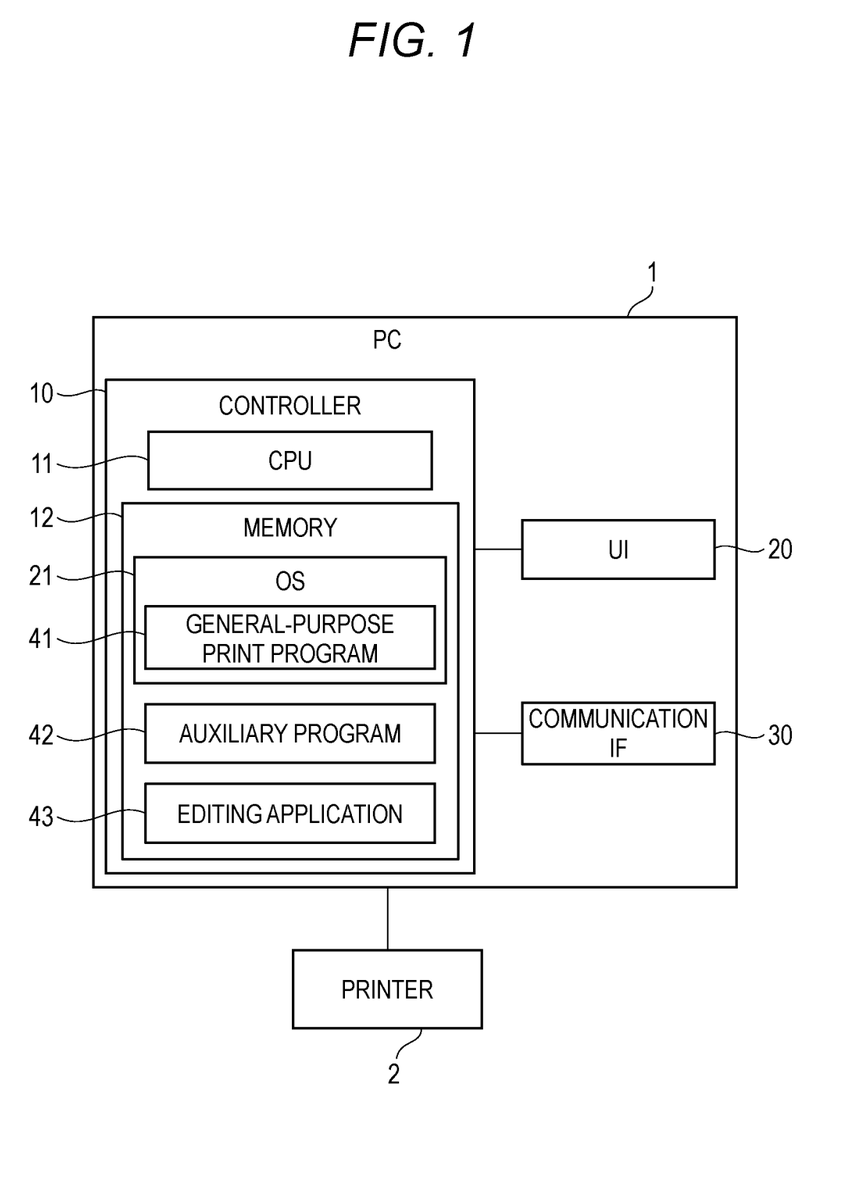
FIG. 1 is a block diagram depicting an electrical configuration of a PC.

As shown in FIG. 1, a PC 1 of the present aspect includes a controller 10, a user interface (hereinbelow referred to as "UI") 20, and a communication interface (hereinbelow referred to as "communication IF") 30. The UI 20 and the communication IF 30 are electrically connected to the controller 10. The PC 1 is an example of the information processing device. The printer 2 is an apparatus having a printing function, and is connected to the PC 1 via local communication or network communication.

The UI 20 includes hardware for performing a variety of displays and receiving a user's instruction input. The UI 20 may be a touch panel having both a display function and an input receiving function or may be a combination of a display having a display function and a keyboard, a mouse and the like each having an input receiving function.

The communication IF 30 includes hardware for performing communication with an external device such as the printer 2 and hardware for accessing the Internet. The communication IF 30 may also include a plurality of interfaces having different communication methods. The communication methods include network communication and USB communication, for example. Also, wired communication and wireless communication are possible.

The controller 10 includes a CPU 11 and a memory 12. The CPU 11 is an example of the computer. The memory 12 includes a ROM, a RAM, and a non-volatile memory, and stores programs such as diverse application programs (hereinbelow, referred to as "application"), a variety of data, and the like. The CPU 11 is configured to execute a variety of processing, in accordance with a program read out from the memory 12 and based on a user's instruction. Note that, the controller 10 in FIG. 1 is a collective term for hardware and software that are used for control of the PC 1, and does not necessarily represent single hardware that is actually provided in the PC 1.

An example of the memory 12 may also be a computer-readable storage medium. The computer-readable storage medium is a non-transitory medium. The non-transitory medium includes a recording medium such as a CD-ROM and a DVD-ROM, in addition to the above examples. Also, the non-transitory medium is a tangible medium. Note that, electric signals for conveying a program that is downloaded from a server on the Internet are a computer-readable signal medium that is a type of the computer-readable medium but are not included in the computer-readable non-transitory storage medium.

As shown in FIG. 1, an OS 21 including a general-purpose print program 41, an auxiliary program 42, and an editing application 43 are stored in the memory 12, for example. The auxiliary program 42 is an example of the support program. The editing application 43 is an example of the application program. The OS 21 is, for example, Microsoft Windows (registered trademark), Mac OS (registered trademark), or Linux (registered trademark). Note that a variety of data including information of the connected printer 2, and a variety of programs such as a browser are stored in the memory 12 in addition to the shown ones.

The general-purpose print program 41 is an OS standard program for causing a variety of printers such as the printer 2 to execute printing in response to an instruction from the PC 1. The general-purpose print program 41 of the present aspect is a program including a function of generating print data, which is used for printing by a corresponding printer, based on image data of a print target.

The general-purpose print program 41 is configured to support a function that can be commonly used by a plurality of models of printers provided by vendors of diverse printers. The general-purpose print program 41 supports not all functions that the diverse printers inherently have, and a function that is supported by the general-purpose print program 41 is limited to a general-purpose function.

The auxiliary program 42 is a program or a program group configured to execute processing based on an instruction from the OS 21 in association with processing of the general-purpose print program 41, and is an application configured to support control of target hardware. The auxiliary program 42 of the present aspect is corresponding to a model of the printer 2 connected to the PC 1, and is activated from the general-purpose print program 41 when an instruction to cause the printer 2 to execute printing by using the general-purpose print program 41 is received, for example. The auxiliary program 42 is referred to as a hardware support application (abbreviated as HSA), for example.

The auxiliary program 42 is configured to receive a plurality of kinds of commands from the general-purpose print program 41 and to execute a variety of processing based on the received commands The auxiliary program 42 can execute different processing, according to contents of execution commands from the general-purpose print program 41. Note that, the auxiliary program 42 may also be a combination of a plurality of programs each of which is configured to receive an execution command, or one program capable of executing different processing, according to commands.

Note that, the auxiliary program may also be a program that is prepared for each type of printers by the vendors of the printers. For example, an auxiliary program for an inkjet printer and an auxiliary program for a laser printer are prepared. The vendor of the printer registers the auxiliary program in a platform that is provided by a vendor of the OS 21, according to a procedure designated by the vendor of the OS 21. When a new printer is connected to the PC 1 and an auxiliary program corresponding to the printer has been registered, the OS 21 downloads the auxiliary program from a server in which the auxiliary program is stored and installs the auxiliary program into the PC 1. Then, the OS 21 stores identification information of the installed auxiliary program in the memory 12, in association with printer information of the newly connected printer. The auxiliary program is not limited to each type of printers, and may also be prepared for each model of printers or each series of printers.

The editing application 43 is, for example, an application for preparing and editing image data and document data, for example. The editing application 43 is, for example, Microsoft Word and PowerPoint. The editing application 43 may also be an application that is provided by the vendor of the printer 2, and the like. The editing application 43 is configured to receive a user operation including an instruction to cause the printer 2 to perform a predetermined operation. Specifically, the editing application 43 is configured to receive a print instruction to cause the printer 2 to execute printing via the UI 20, for example.

Note that, each processing and step of the flowcharts of the embodiments basically indicate processing of the CPU 11 according to commands described in the program such as the auxiliary program 42. That is, in descriptions below, the processing "determination", "extraction", "selection", "calculation", "decision", "specifying", "acquisition", "reception", "control" and the like indicates the processing of the CPU 11. The processing that is executed by the CPU 11 includes hardware control using an API of the OS 21. In the present specification, operations of each program are describe while omitting the detailed descriptions of the OS 21. That is, in descriptions below, the description "a program B controls a hardware C" may indicate that "program B controls the hardware C by using an API of the OS 21". Also, the processing of the CPU 11 according to commands described in the program may be described in omitted wording. For example, a description may be made with omitting a program, such as "CPU 11 performs". Also, the processing of the CPU 11 according to commands described in the program may be described in CPU-omitted wording, such as "program A performs".

Note that, "acquisition" is used as a concept that a request is not essential. That is, the processing of receiving data without a request of the CPU 11 is also included in a concept "CPU 11 acquires data". Also, "data" in the present specification is indicated by a computer-readable bit string. Data that have substantially the same meaning or contents but have different formats are treated as the same data. The same applies to "information" in the present specification. Also, "request" and "instruct" are concepts indicating that information indicative of a request and information indicative of an instruction are output to the other party. Also, the information indicative of a request and the information indicative of an instruction are simply referred to as "request" and "instruction".

Also, the processing of the CPU 11 of determining whether information A indicates a matter B may be conceptually described such as "it is determined from the information A whether it is the matter B". The processing of the CPU 11 of determining whether the information A indicates the matter B or a matter C may be conceptually described such as "it is determined from the information A whether it is the matter B or the matter C".

Figure 2:
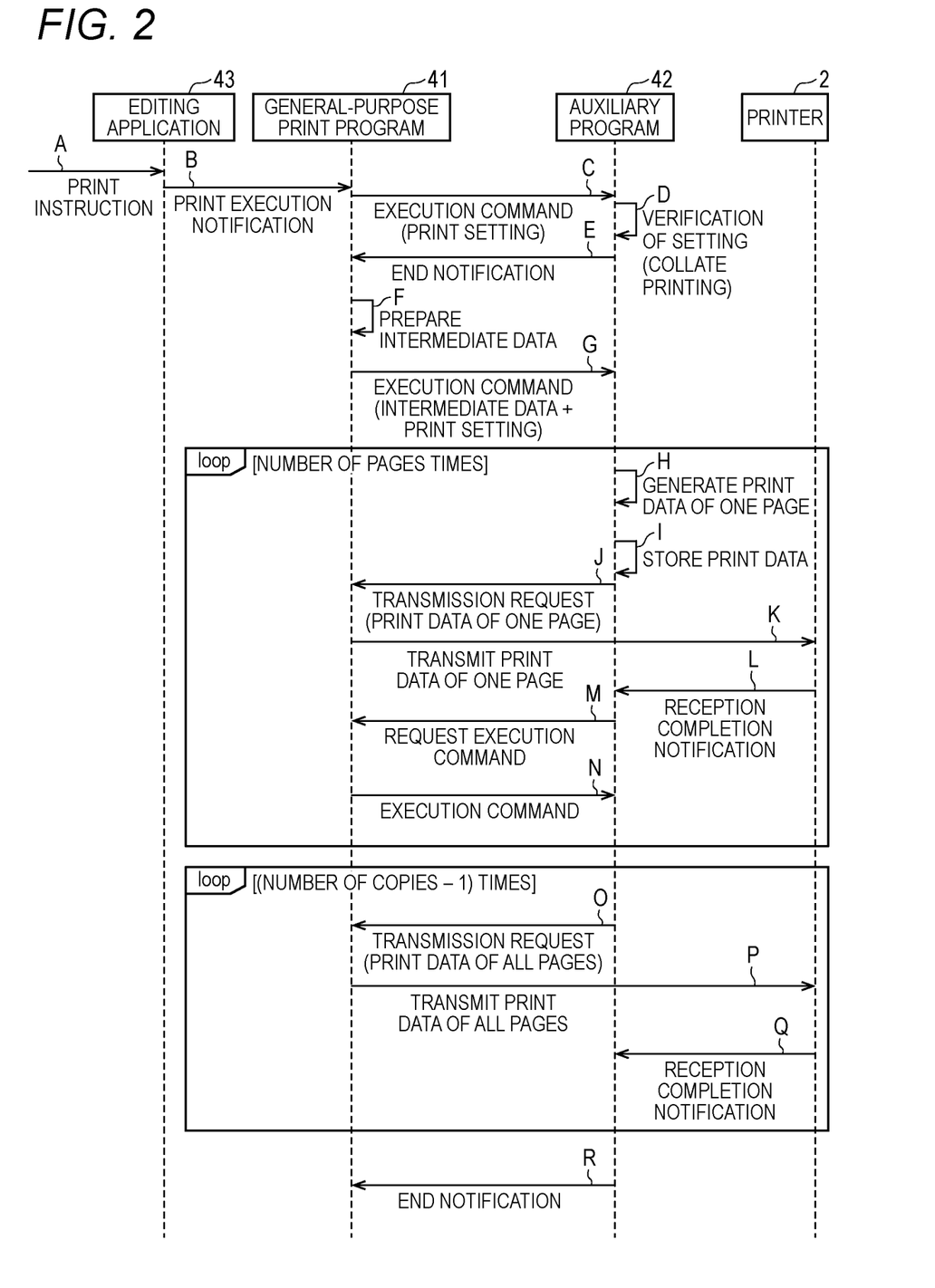
FIG. 2 is a sequence diagram for illustrating an example of a sequence of operations of a first aspect.

Subsequently, a printing procedure including operations of the auxiliary program 42 of the present aspect is described with reference to a sequence diagram of FIG. 2. When printing a plurality of copies of images of a print target having a plurality of pages, the printing procedure includes collate printing and uncollate printing. The collate printing is a printing method in which a designated number of copies are sequentially printed one copy by one copy, and one printed material including pages from a head page to a last page one page by one page is regarded as one copy. The uncollate printing is a printing method in which each page from a head page to a last page is continuously printed by a designated number of copies. For example, when printing images of three pages by three copies, a print order is "123123123" in the collate printing, and "111222333" in the uncollate printing. The PC 1 of the present aspect can cause the printer 2 to implement the collate printing by using the auxiliary program 42.

The general-purpose print program 41 of the present aspect may not support a print setting for multiple-copy printing, and may support only the uncollate printing in the print setting for multiple-copy printing. Also, the printer 2 of the present aspect may not have a function of performing processing of printing multiple copies in the printer, and may support only the uncollate printing in the print setting for multiple-copy printing.

First, the editing application 43 receives an instruction input of designation on an image of a print target and print execution via the UI 20 (arrow A). The editing application 43 receives, for example, an instruction to designate, as an image of a print target, a document edited by the editing application 43, a photograph read by the editing application 43, and the like. The editing application 43 that receives the print instruction transfers a print execution notification indicative of a content of the received print instruction to the OS 21. Note that, in FIG. 2, operations of the OS 21 are omitted.

When the OS 21 receives the print execution notification using the general-purpose print program 41, the OS 21 executes the general-purpose print program 41 and transfers the print execution notification to the general-purpose print program 41 (arrow B). The general-purpose print program 41 can acquire a variety of information included in the print instruction, for example, information indicative of a printer to perform printing, information indicative of the print setting set by the editing application 43, and information indicative of image data of a print target by the print execution notification.

The general-purpose print program 41 specifies a printer designated as an apparatus caused to perform printing based on the information included in the print execution notification. When the designated printer is the printer 2, since the auxiliary program 42 that is corresponding to the printer 2 is stored in the memory 12, the general-purpose print program 41 outputs an execution command for processing of the auxiliary program 42, and causes the auxiliary program 42 to operate (arrow C). That is, when the general-purpose print program 41 detects the print execution notification, the execution command is output from the general-purpose print program 41 to the auxiliary program 42.

The auxiliary program 42 executes a variety of processing based on the content of the execution command output from the general-purpose print program 41. In the execution command in the processing of the arrow C, the general-purpose print program 41 transfers the print setting received by the editing application 43 to the auxiliary program 42, and requests verification of the print setting.

The auxiliary program 42 verifies the print setting based on the execution command in the processing of the arrow C (arrow D). The auxiliary program 42 determines whether the received print setting is suitable for a function of the printer 2. For example, when the print setting includes an unsuitable option, such as a sheet size that is not set for the printer 2, the auxiliary program 42 invalidates the print setting.

The auxiliary program 42 of the present aspect can receive settings of changing and adding a print setting during the processing of the arrow D. In the present aspect, described is a case where an image designated as a range of the print target is an image having a plurality of pages and the auxiliary program 42 receives a designation of printing of N copies by the collate printing in the processing of the arrow D, where N is a natural number of 2 or greater. That is, the print setting that is transferred in the processing of the arrow C does not include a setting for multiple-copy printing by the collate printing, and the print setting upon completion of the processing of the arrow D includes a setting for multiple-copy printing by the collate printing.

Note that, in a case where a setting for multiple-copy printing and a designation of collate printing can be received by the editing application 43, a setting for multiple-copy printing and a designation of collate printing may be included in the print setting that is transferred to the auxiliary program 42 in the processing of the arrow C. For example, in a case where the general-purpose print program 41 supports the collate printing, the print setting including a setting for multiple-copy printing and a designation of collate printing may be transferred in the processing of the arrow C. Alternatively, even in a case where the general-purpose print program 41 does not support the collate printing, a setting for multiple-copy printing and a designation of collate printing may be transferred from the editing application 43 to the auxiliary program 42 via a storage area that can be commonly used between the editing application 43 and the auxiliary program 42, for example.

When the auxiliary program 42 completes the verification of the print setting, the auxiliary program 42 transfers an end notification to the general-purpose print program 41 (arrow E). Note that, the auxiliary program 42 deletes the setting for multiple-copy printing and the designation of collate printing from the print setting, and transfers the same to the general-purpose print program 41 together with the end notification in the processing of the arrow E.

When the general-purpose print program 41 receives the end notification, which indicates that the verification of the print setting is over, from the auxiliary program 42, the general-purpose print program 41 converts a format of the image data included in the print execution notification in the processing of the arrow B into a format of intermediate data for printing to prepare intermediate data, and generates a print job including the intermediate data (arrow F). The image data designated by the editing application 43 has various formats, and the general-purpose print program 41 converts the received image data into intermediate data suitable for generation of print data. Note that, when the image data included in the print execution notification is data suitable for generation of print data, the generation of the intermediate data may be omitted and the image data may be used as the intermediate data, as it is. The intermediate data is XPS data, for example.

After generating the intermediate data, the general-purpose print program 41 transfers the generated intermediate data and the print setting to the auxiliary program 42, outputs an execution command for processing of the auxiliary program 42, and operates the auxiliary program 42 (arrow G).

The auxiliary program 42 generates print data of one page from the head page of the intermediate data based on the received intermediate data (arrow H). The processing of the arrow H is an example of the first acquisition processing. In the processing of the arrow H, the auxiliary program 42 rasterizes the intermediate data to generate the print data. The print data generated in the processing of the arrow H is data having a format that can be used for printing in the printer 2, and is, for example, PDL data dedicated to the model of the printer 2. The rasterization in the auxiliary program 42 increases a possibility that print data having a higher degree of freedom and more suitable for printing in the printer 2 will be generated, as compared to rasterization in the general-purpose print program 41. Note that, the print data generated in the processing of the arrow H may also be data having a format that can be used for printing in a printer, in addition to the model of the printer 2.

Also, the auxiliary program 42 temporarily stores the generated print data in the memory 12 (arrow I). The auxiliary program 42 transfers the generated print data of one page and a transmission request for the print data in which the printer 2 is set as a transmission destination to the general-purpose print program 41 (arrow J). The general-purpose print program 41 transmits the received print data and a print command to the printer 2 based on the request in the processing of the arrow J (arrow K). Since the print data is transmitted to the printer 2 by the request in the processing of the arrow J, the processing of the arrow J is an example of the first output processing.

In the printer 2 that receives the print command, printing of an image of one page of a first one copy is performed according to the received print data of one page. The print data of one page is transmitted the printer 2 whenever the print data of one page is generated, so that a standby time until a first page is printed is shortened, as compared to a case where print data of all pages are generated and then transmitted.

Note that, since a setting for multiple-copy printing is not included in the print setting received in the processing of the arrow E, the general-purpose print program 41 transmits the print data in the processing of the arrow K with a print setting that does not include the setting for multiple-copy printing added. Thereby, even though the printer 2 itself can perform the processing of printing multiple copies, there is no possibility that printing of multiple copies will be performed in the printer 2.

The auxiliary program 42 transfers the transmission request in the processing of the arrow J to the general-purpose print program 41 at transmission timing of the print data to the printer 2, and then periodically transmits a signal for inquiring a situation to the printer 2, for example. The printer 2 replies a situation, in response to the inquiry, and when the reception of the print data is completed, the printer 2 transmits a reception completion notification, which indicates that the reception of the print data is completed, to the auxiliary program 42 (arrow L). The reception completion notification is a notification indicating that the reception is completed, and the printing may not be completed. Note that, the reception completion notification may also be transmitted to the general-purpose print program 41.

When the auxiliary program 42 receives the reception completion notification transmitted from the printer 2, the auxiliary program 42 requests the general-purpose print program 41 to transmit an execution command of the auxiliary program 42 (arrow M). Thereby, the general-purpose print program 41 transfers an execution command to the auxiliary program 42 (arrow N). The auxiliary program 42 receives the execution command from the general-purpose print program 41, and generates print data of next one page in the processing of the arrow H. Note that, in a case where the reception completion notification in the processing of the arrow L is transmitted to the general-purpose print program 41, the processing of requesting the execution command (arrow M) may be omitted, and the general-purpose print program 41 may transfer the execution command (arrow N) to the auxiliary program 42, according to the reception completion notification.

The general-purpose print program 41 and the auxiliary program 42 repeat the processing of the arrow H to the arrow N for all pages that are the range of the print target. For example, the auxiliary program 42 also receives information indicative of the number of pages of images of the print target in the processing of the arrow G, and repeats the generation and storing of print data until the number of processing times of the arrow H reaches the number of pages. In the processing of the arrow I, print data of next page is stored following the stored print data of a previous page. Thereby, the print data of first one copy is transmitted to the printer 2 each time each page is acquired, and the print data of all pages is stored in the memory 12.

Note that, if the auxiliary program 42 can start the generation of the print data when the notification of the arrow L is received even though the execution command is not received, the transfer in the processing of the arrow M and the arrow N is unnecessary. Also, if the general-purpose print program 41 has a configuration of transferring the intermediate data one page by one page, the auxiliary program 42 may request intermediate data of next one page in the processing of the arrow M, and receive the intermediate data of one page in the processing of the arrow N. In this case, when transferring intermediate data of a final page of the range of the print target, the general-purpose print program 41 may transfer information indicative of the final page to the auxiliary program 42.

When the auxiliary program 42 receives the execution command in the processing of the arrow N after the generation and transmission of the print data of all pages are over, the auxiliary program 42 acquires the stored print data of all pages, i.e., the print data of first copy from the memory 12, and transfers the same to the general-purpose print program 41 together with a transmission request (arrow O). The general-purpose print program 41 transmits the received print data and the print command to the printer 2 based on the request in the processing of the arrow O (arrow P). Since the print data is transmitted to the printer 2 according to the request in the processing of the arrow O, the processing of the arrow O is an example of the first output processing. Thereby, the printer 2 that receives the print command executes printing of a second copy of all pages based on the print data of all pages attached to the print command.

The auxiliary program 42 receives the reception completion notification from the printer 2 (arrow Q), similar to the processing of the arrow L, and transfers a transmission request for next one copy to the general-purpose print program 41 (arrow O). Note that, if the auxiliary program 42 is configured to request and receive the execution command, similar to the processing of first copy, so as to execute a next step, the transfer similar to the processing of the arrow M and the arrow N may be performed even after the processing of the arrow Q. The auxiliary program 42 repeats the transmission request in the processing of the arrow O by a number of times smaller than the designated copies by one. Thereby, the printing of the designated N copies is performed together with the printing of first copy by the transmission request in the processing of the arrow J.

When the auxiliary program 42 receives the reception completion notification in the processing of the arrow Q after executing the transmission request in the processing of the arrow O (N−1) times, the auxiliary program 42 transfers the end notification to the general-purpose print program 41 (arrow R), and ends the processing of the job. Thereby, the general-purpose print program 41 ends the processing of the print execution notification received from the editing application 43 in the processing of the arrow B.

Note that, the reception completion notification in the processing of the arrow Q may also be transmitted from the printer 2 to the general-purpose print program 41. In this case, the general-purpose print program 41 may request the print data from the auxiliary program 42 in response to the reception completion notification. Also, when transmitting the print data in the processing of the arrow O, the auxiliary program 42 may include information indicative of presence or absence of subsequent print data in the print data. Alternatively, the auxiliary program 42 may copy the print data to generate print data of (N−1) copies, and integrate and transmit the print data of (N−1) copies to the general-purpose print program 41 by the transmission request in the processing of the arrow O one time.

As described in detail above, according to the auxiliary program 42 of the present aspect, in a case where a print instruction to the general-purpose print program 41 to cause the printer 2 to execute the multiple-copy printing by the collate printing based on the print instruction, the PC 1 acquires the print data of one copy based on the image having the plurality of pages, which is the range of the print target, by the auxiliary program 42, and outputs the print data such that the print data is transmitted to the printer 2 one copy by one copy over N copies. Thereby, even though the general-purpose print program 41 does not support the collate printing, it is possible to cause the printer 2 to execute the collate printing.

Figure 3:
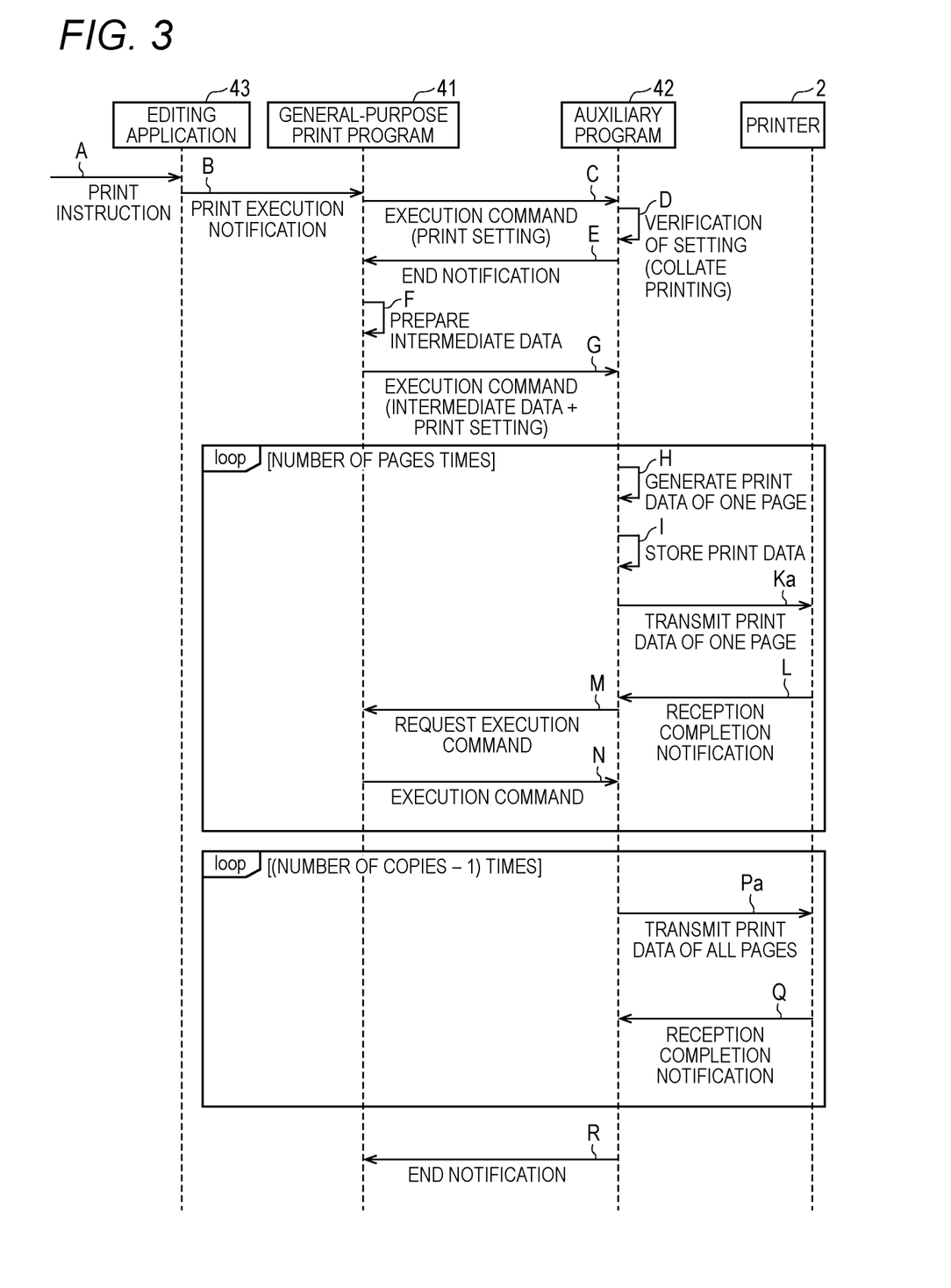
FIG. 3 is a sequence diagram for illustrating an example of the sequence of operations of the first aspect.

Note that, in the first aspect, in the processing of the arrow J and the arrow O, the auxiliary program 42 transfers the print data and the transmission request to the general-purpose print program 41, and the general-purpose print program 41 transmits the print data to the printer 2. However, for example, as shown in FIG. 3, the auxiliary program 42 may transmit the print data to the printer 2. That is, instead of the processing of the arrow J and the arrow K shown in FIG. 2, when the generation and storing of the print data are over, the auxiliary program 42 may transmit the generated print data of one page to the printer 2 (arrow Ka). Also, instead of the processing of the arrow O and the arrow P shown in FIG. 2, the auxiliary program 42 may transmit the print data of all pages to the printer 2 (arrow Pa). In this case, the processing of the arrow Ka and the arrow Pa is an example of the first output processing.

Note that, also in this case, the reception completion notification in the processing of the arrow L or the arrow Q may be transmitted from the printer 2 to the general-purpose print program 41. The general-purpose print program 41 may transfer a transmission command to the auxiliary program 42 in response to the reception completion notification, and the auxiliary program 42 may transmit next print data.

Even in this way, the print data of the first copy is transmitted to the printer 2 each time print data of one page is generated, and an elapsed time until the printing of a first page is short. Note that, in a case where the auxiliary program 42 transmits the print data to the printer 2, the auxiliary program 42 may receive and transfer information indicating whether the transmission of the print data is successful and a response (a normal end signal or an error signal) from the printer to the OS 21, for example, after transmitting the print data to the printer 2.

Figure 4:
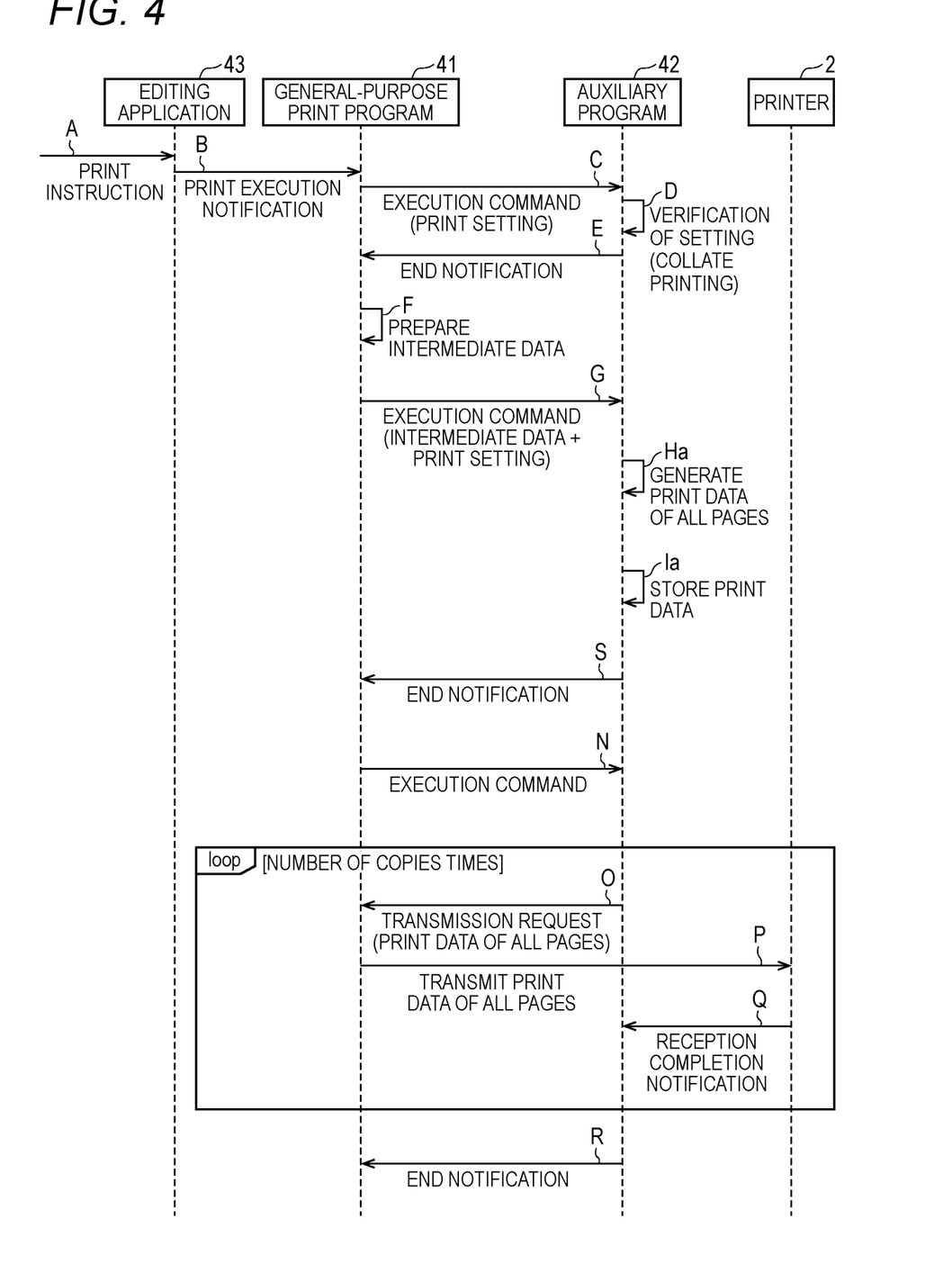
FIG. 4 is a sequence diagram for illustrating an example of a sequence of operations of a second aspect.

Subsequently, a printing procedure including operations of the auxiliary program 42 of a second aspect is described with reference to a sequence diagram of FIG. 4. The second aspect is different from the first aspect, with respect to the procedure of the generation and transmission of the print data. In descriptions below and FIG. 4, the same processing as the first aspect is denoted with the same reference signs, and the descriptions thereof are omitted. Also, the processing that is similar to but is different from the processing of the first aspect is denoted with reference signs having lower-case letters and is described with respect to differences from the first aspect.

In the second aspect, similar to the first aspect, the processing of the arrow A to the arrow G is first executed. In the second aspect, the auxiliary program 42 receives the intermediate data of all pages that is the print range and generates the print data of all pages by the execution command in the processing of the arrow G (arrow Ha). The processing of the arrow Ha is an example of the first acquisition processing. Also, the auxiliary program 42 temporarily stores the generated print data of all pages in the memory 12 (arrow Ia).

When the generation and storing of the print data of all pages are over, the auxiliary program 42 transfers the end notification to the general-purpose print program 41 (arrow S). The general-purpose print program 41 receives the end notification, and transfers the execution command to the auxiliary program 42 (arrow N).

In the second aspect, the processing of transmitting the generated print data of all pages to the printer 2 repeatedly N times, which is the designated number of copies, is executed. That is, the auxiliary program 42 transfers the print data of all pages and the transmission request to the general-purpose print program 41 (arrow O), and the general-purpose print program 41 integrates and transmits the print data of all pages to the printer 2 (arrow P). The processing of the arrow O is an example of the first output processing. When the auxiliary program 42 receives the reception completion notification from the printer 2 (arrow Q), the auxiliary program 42 transfers the print data of all pages of next copy and the transmission request to the general-purpose print program 41.

The processing from the arrow O to the arrow Q is repeated N times, so that the printing of N copies is performed in the printer 2. After receiving the $N^{th}$ reception completion notification, the auxiliary program 42 transfers the end notification to the general-purpose print program 41 (arrow R), and ends the processing of the job. Note that, also in the second aspect, instead of the processing of the arrow O and the arrow P, the auxiliary program 42 may transmit the print data to the printer 2, like the processing of the arrow Pa shown in FIG. 3.

Note that, also in the second aspect, the reception completion notification in the processing of the arrow Q may be transmitted from the printer 2 to the general-purpose print program 41. In this case, the general-purpose print program 41 may request subsequent print data from the auxiliary program 42 in response to the reception completion notification. Also, when transmitting the print data in the processing of the arrow O, the auxiliary program 42 may include information indicative of presence or absence of subsequent print data in the print data. Alternatively, the auxiliary program 42 may copy the print data to generate print data of N copies, and integrate and transfer the print data of N copies to the general-purpose print program 41 by the first transmission request in the processing of the arrow O.

As described in detail above, the auxiliary program 42 of the second aspect also implements the multiple-copy printing by the collate printing. In the second aspect, after generating the print data of all pages, the print data of all pages is integrated and transmitted to the printer 2. Therefore, the number of transfers between the auxiliary program 42 and the general-purpose print program 41 is reduced and the processing of the auxiliary program 42 is simplified, so that it is possible to reduce the design process. Also, the number of communications between the PC 1 and the printer 2 is reduced.

Figure 5:
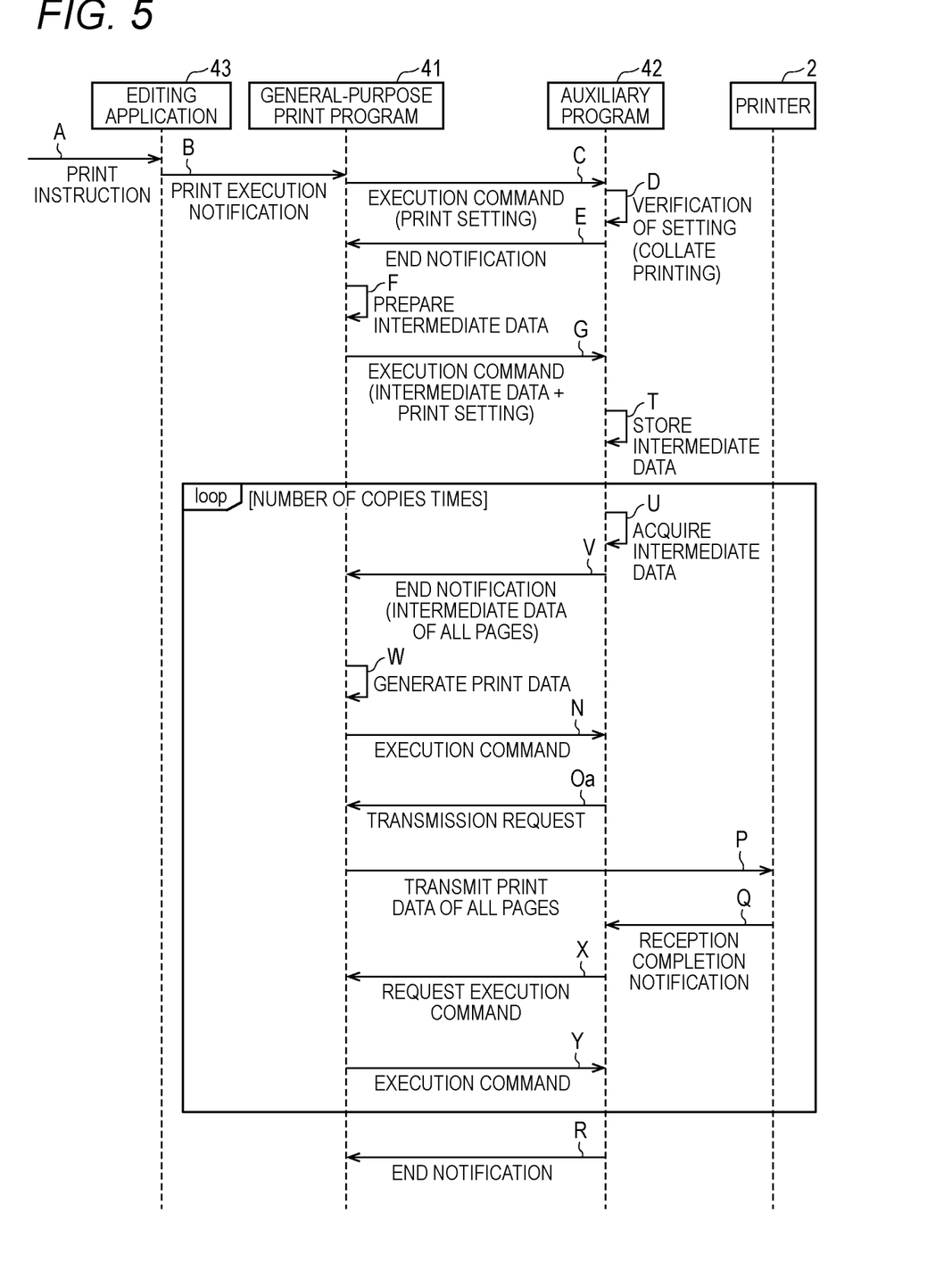
FIG. 5 is a sequence diagram for illustrating an example of a sequence of operations of a third aspect.

Subsequently, a printing procedure including operations of the auxiliary program 42 of a third aspect is described with reference to a sequence diagram of FIG. 5. The third aspect is different from the first aspect, with respect to the procedure of the generation and transmission of the print data. In descriptions below and FIG. 5, the same processing as the first aspect is denoted with the same reference signs, and the descriptions thereof are omitted. Also, the processing that is similar to but is different from the processing of the first aspect is denoted with reference signs having lower-case letters and is described with respect to differences from the first aspect.

In the third aspect, similar to the first aspect, the processing of the arrow A to the arrow G is first executed. In the third aspect, the auxiliary program 42 receives the intermediate data of all pages that is the range of the print target and stores the received intermediate data in the memory 12 by the execution command in the processing of the arrow G (arrow T). Also, the auxiliary program 42 of the third aspect acquires the intermediate data of all pages stored in the memory 12 (arrow U), and transfers the acquired intermediate data of all pages and the end notification to the general-purpose print program 41 (arrow V).

The general-purpose print program 41 rasterizes the received intermediate data of all pages to generate the print data of all pages (arrow W). Note that, the print data generation processing by the general-purpose print program 41 is different from the print data generation processing by the auxiliary program 42 of the first aspect and the second aspect. The print data generated by the general-purpose print program 41 is data having a format that can be used for printing in diverse printers including the printer 2, and is, for example, PWG Raster data and PDF data. The rasterization by the general-purpose print program 41 can reduce the processing of the auxiliary program 42 and suppress the design process of the auxiliary program 42.

Also, the general-purpose print program 41 transfers the execution command to the auxiliary program 42 (arrow N). The auxiliary program 42 transfers the transmission request to the general-purpose print program 41 in response to the execution command (arrow Oa). Since the general-purpose print program 41 generates the print data, it is not necessary to transfer the print data in the processing of the arrow Oa. The general-purpose print program 41 transmits the print data of all pages generated in the processing of the arrow W to the printer 2 (arrow P). Thereby, the printing is executed in the printer 2, so that a printed material of one copy can be prepared.

In the third aspect, since the print data is generated and transmitted to the printer 2 based on the processing of the arrow V, the processing of the arrow V is an example of the second output processing. Note that, in a case where the print data is generated and transmitted by the end notification in the processing of the arrow V, the execution command in the processing of the arrow N and the transmission request in the processing of the arrow Oa are unnecessary.

When the auxiliary program 42 receives the reception completion notification from the printer 2 (arrow Q), the auxiliary program 42 transfers a request for execution command to the general-purpose print program 41 (arrow X). The general-purpose print program 41 transfers an execution command to the auxiliary program 42 in response to the request in the processing of the arrow X (arrow Y). The auxiliary program 42 receives the execution command, returns to the processing of the arrow U, acquires the intermediate data for printing of a second copy from the memory 12, and transfers the same to the general-purpose print program 41. In the third aspect, the processing from the arrow U to the arrow Y is repeated N times, which is the designated number of copies, so that printed materials of N copies are prepared. Note that, instead of repeating the processing of transferring the intermediate data N times, the auxiliary program 42 may generate a copy of the intermediate data, integrate the intermediate data of all pages of N copies in the first processing of the arrow V and transfer the same to the general-purpose print program 41.

When the auxiliary program 42 further receives the execution command from the general-purpose print program 41 after transferring the $N^{th}$ intermediate data to the general-purpose print program 41 (arrow Y), the auxiliary program 42 transfers the end notification to the general-purpose print program 41 (arrow R), and ends the processing of the job.

As described in detail above, the auxiliary program 42 of the third aspect also implements the multiple-copy printing by the collate printing. In the third aspect, the general-purpose print program 41 generates and transmits the print data, so that the processing of the auxiliary program 42 is simple and the design process is reduced.

Figure 6:
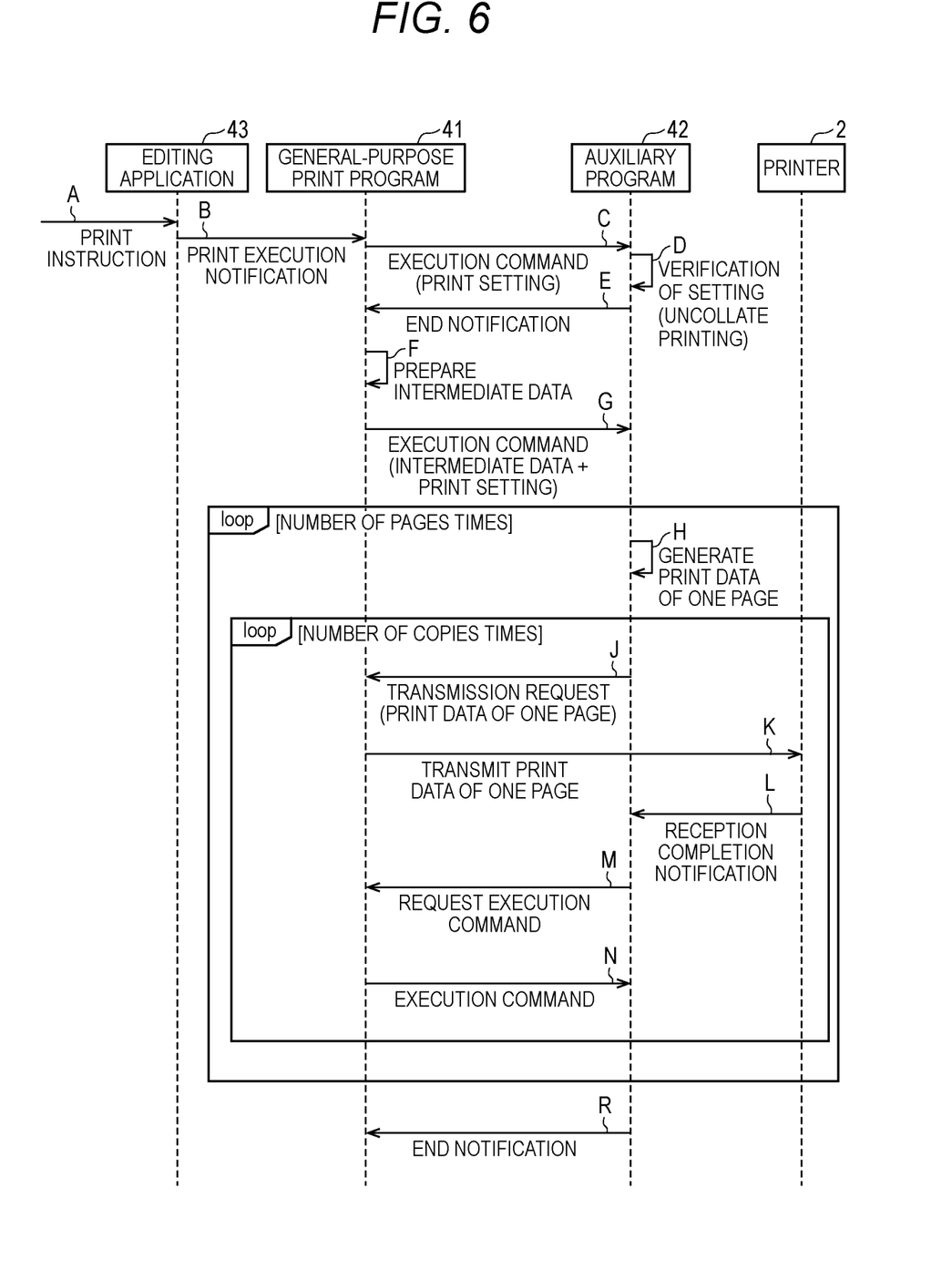
FIG. 6 is a sequence diagram for illustrating an example of a sequence of operations when performing uncollate printing.

Note that, in the above embodiments, the collate printing has been described. However, the auxiliary program 42 of each aspect also receives a designation of multiple-copy printing by uncollate printing. For example, in a case where the print setting received in the processing of the arrow D shown in FIG. 2 is a setting for printing of M copies by the uncollate printing, where M is a natural number of 2 or greater, an operation procedure of the auxiliary program 42 is as shown in FIG. 6, for example.

The auxiliary program 42 receives the intermediate data from the general-purpose print program 41 (arrow G), and generates the print data of one page (arrow H). Then, the auxiliary program 42 transfers the generated print data of one page and the transmission request to the general-purpose print program 41 (arrow J), and the general-purpose print program 41 transmits the print data of one page to the printer 2 (arrow K). Similar to the collate printing, the auxiliary program 42 receives the reception completion notification from the printer 2 (arrow L), and transfers the request for execution command to the general-purpose print program 41 (arrow M), so that the auxiliary program 42 receives the execution command from the general-purpose print program 41 (arrow N). The processing from the arrow J to the arrow N is repeated M times, which is the designated number of copies, so that the print data of first page is continuously transmitted M times to the printer 2.

The auxiliary program 42 returns to the processing of the arrow H and generates print data of a next page, in response to the execution command in the processing of the arrow N after the print data is transmitted multiple times corresponding to the number of copies. Then, the auxiliary program 42 causes the general-purpose print program 41 to transmit the generated next page repeatedly multiple times corresponding to the number of copies. The processing of repeating the processing from the arrow H to the arrow N is an example of the uncollate transmission processing.

Note that, also in the uncollate printing, there is a plurality of variations. For example, the print data may be generated by the general-purpose print program 41. Also, the auxiliary program 42 may transmit the print data to the printer 2.

In a case where the auxiliary program 42 of the present aspect receives a print instruction of multiple-copy printing of images whose range of the print target is multiple pages, the auxiliary program 42 receives any one of the designation of the collate printing and the designation of the uncollate printing. Then, the auxiliary program 42 executes the processing of any one of FIGS. 2 to 5 or the processing of FIG. 6, in response to the received designation. By supporting the uncollate printing, the degree of freedom of the print setting is increased.

Note that, the embodiments disclosed herein are just exemplary and are not intended to limit the present invention. Therefore, the technology disclosed herein can be diversely improved and modified without departing from the spirit thereof. For example, the apparatus that is connected to the PC 1 is not limited to the printer, and any apparatus having a printing function such as a complex machine, a copier and a FAX apparatus is also possible. Also, two or more printers may be connected to the PC 1.

Also, regarding a print setting for printing other than the multiple-copy printing, a print setting that can be processed by the general-purpose print program 41 may be processed by the general-purpose print program 41, and a print setting that cannot be processed by the general-purpose print program 41 may be processed by the auxiliary program 42. In the above embodiments, as the operation of the auxiliary program 42, only the processing relating to the multiple-copy printing has been described. However, the auxiliary program 42 may also have other functions.

Also, in the first or second aspect, the auxiliary program 42 generates the print data. However, the print data may also be generated by the general-purpose print program 41. For example, the auxiliary program 42 may receive the print data of all pages generated by the general-purpose print program 41 and store the same in the memory 12, and may transmit the print data to the printer 2 one copy by one copy.

Also, in the present aspect, the designation of the uncollate printing is also received but may not be received. For example, when a print instruction for printing the images of the plurality of pages by multiple copies is received, the collate printing may be executed.

Also, when performing printing by using the general-purpose print program 41, the auxiliary program 42 may be any program that receives an instruction from the OS 21 or the general-purpose print program 41. For example, a print workflow application (Print workflow) released by Microsoft may be possible.

Also, in the above embodiments, the execution command of the auxiliary program 42 is output from the general-purpose print program 41, so that the auxiliary program 42 is executed. However, the execution timing of the auxiliary program 42 is not limited thereto. For example, the auxiliary program 42 may be directly executed by an instruction from the OS 21 or the resident auxiliary program 42 is also possible. The resident auxiliary program 42 may perform the above operations by receiving the execution command.

Note that, the plurality of processing in the plurality of steps in the flowcharts described in the embodiments can be executed by changing the execution order arbitrarily or can be executed in parallel within a scope that does not cause any contradiction in the processing content.

Note that, the processing described in the embodiments can be executed by hardware such as a single CPU, a plurality of CPUs, an ASIC and the like or a combination thereof. Also, the processing described in the embodiments can be implemented in diverse aspects such as a recording medium on which a program for executing the processing is recorded, a method and the like.

What is claimed is:

1. A non-transitory computer readable medium that stores a support program executable by a computer included in an information processing device, the support program being corresponding to a printer connected to the information processing device,
   in a case where a print instruction that is output from an application program installed in the information processing device and that causes the printer to execute printing of an image is sent to a general-purpose print program installed in advance in an operating system of the information processing device to cause the printer to execute collate printing in a job based on the print instruction, the collate printing being processing of sequentially printing N copies one copy by one copy, printing of the one copy being printing of the image having a plurality of pages that is a range of a print target, N being a natural number of 2 or greater, the support program causing the computer to execute:
   receiving intermediate print data of the one copy from the general-purpose print program;
   generating print data by rasterizing the received intermediate print data; and
   outputting the generated print data one copy by one copy over the N copies such that the print data of the N copies is transmitted from the information processing device to the printer as a transmission destination.

2. The non-transitory computer readable medium according to claim 1,
   wherein, in a case where the print instruction is sent to the general-purpose print program to cause the printer to execute uncollate printing in a job based on the print instruction, the uncollate printing being processing of printing the image having the plurality of pages that is the range of the print target continuously M times one page by one page, M being a natural number of 2 or greater, the support program causes the computer to execute:

uncollate transmission processing of performing continuous transmission of continuously transmitting print data rasterized based on the image having the plurality of pages to the printer M times one page by one page, and performing the continuous transmission for all pages.

3. The non-transitory computer readable medium according to claim 1, wherein, in a case where the print instruction is sent to the general-purpose print program to cause the printer to execute uncollate printing in a job based on the print instruction, the uncollate printing being processing of printing the image having the plurality of pages that is the range of the print target continuously M times one page by one page, M being a natural number of 2 or greater, the support program causes the computer to execute:

uncollate transmission processing of performing continuous transmission of continuously transmitting print data rasterized based on the image having the plurality of pages to the printer M times one page by one page, and performing the continuous transmission for all pages.

4. An information processing device comprising a computer, wherein an operating system of the information processing device has a general-purpose print program installed in advance in the operating system, wherein a support program is corresponding to a printer connected to the information processing device and an application program to which a print instruction that causes the printer to print an image via the general-purpose print program is capable of being input are installed in the information processing device, and wherein, in a case where the print instruction is output from the application program to cause the printer to execute collate printing in a job based on the print instruction, the collate printing being processing of sequentially printing N copies one copy by one copy, printing of the one copy being printing of the image having a plurality of pages that is a range of a print target, N being a natural number of 2 or greater, the computer, when instructed by the support program, executes:

receiving intermediate print data of the one copy from the general-purpose print program;

generating print data by rasterizing the received intermediate print data; and outputting the generated print data one copy by one copy over the N copies such that the print data of the N copies is transmitted from the information processing device to the printer as a transmission destination.

5. A printing method of causing a printer to execute printing based on print data generated in an information process device, the printer being connected to the information processing device, an operating system of the information processing device having a general-purpose print program installed in advance in the operating system, a support program corresponding to the printer connected to the information processing device and an application program to which a print instruction that causes the printer to print an image via the general-purpose print program is capable of being input being installed in the information processing device, in a case where the print instruction is output from the application program to cause the printer to execute collate printing in a job based on the print instruction, the collate printing being processing of sequentially printing N copies one copy by one copy, printing of the one copy being printing of the image having a plurality of pages that is a range of a print target, N being a natural number of 2 or greater, the printing method, which is executed by the support program, comprising:

receiving intermediate print data of the one copy from the general-purpose print program;

generating print data by rasterizing the received intermediate print data; and outputting the generated print data one copy by one copy over the N copies such that the print data of the N copies is transmitted from the information processing device to the printer as a transmission destination.

* * * * *